(12) United States Patent
Mehus et al.

(10) Patent No.: US 9,376,306 B2
(45) Date of Patent: Jun. 28, 2016

(54) METHODS OF DISPENSING

(71) Applicant: Ecolab USA Inc., St. Paul, MN (US)

(72) Inventors: Richard J. Mehus, Richfield, MN (US); John E. Thomas, River Falls, WI (US); Thomas J. Batcher, Mendota Heights, MN (US); Bryan A. Maser, Inver Grove Heights, MN (US); Michael N. Shulman, Minneapolis, MN (US)

(73) Assignee: ECOLAB INC., St. Paul, MN (US)

( * ) Notice: Subject to any disclaimer, the term of this patent is extended or adjusted under 35 U.S.C. 154(b) by 310 days.

(21) Appl. No.: 14/029,374

(22) Filed: Sep. 17, 2013

(65) Prior Publication Data

US 2014/0017142 A1  Jan. 16, 2014

Related U.S. Application Data

(62) Division of application No. 10/436,454, filed on May 12, 2003, now abandoned.

(51) Int. Cl.

| | |
|---|---|
| *G01G 13/24* | (2006.01) |
| *B67D 7/08* | (2010.01) |
| *A47L 15/44* | (2006.01) |
| *B01F 1/00* | (2006.01) |
| *B01F 15/00* | (2006.01) |
| *B01F 15/04* | (2006.01) |
| *B67D 7/02* | (2010.01) |
| *D06F 39/02* | (2006.01) |

(52) U.S. Cl.
CPC ............... *B67D 7/08* (2013.01); *A47L 15/4436* (2013.01); *B01F 1/0027* (2013.01); *B01F 15/00123* (2013.01); *B01F 15/00194* (2013.01); *B01F 15/00344* (2013.01); *B01F 15/0445* (2013.01); *B67D 7/02* (2013.01); *D06F 39/02* (2013.01); *G01G 13/24* (2013.01)

(58) Field of Classification Search
CPC .............................. G01G 17/00; G01G 13/24
USPC ........... 422/255, 257, 261; 222/52, 57, 58, 77
See application file for complete search history.

(56) References Cited

U.S. PATENT DOCUMENTS

| 33,861 A | 12/1861 | Whitney |
|---|---|---|
| 1,985,615 A | 12/1934 | Mitchell |
| 2,219,597 A | 10/1940 | Lutz |

(Continued)

FOREIGN PATENT DOCUMENTS

| DE | 100 39 408 A1 | 12/2001 |
|---|---|---|
| GB | 2052251 | 1/1981 |

(Continued)

OTHER PUBLICATIONS

Nova Controls, Nova News, "Save Money *and* Gain Sales Features?" Aug. 12, 1992, 1 pg.

(Continued)

*Primary Examiner* — Sean E Conley
(74) *Attorney, Agent, or Firm* — Shumaker & Sieffert, P.A.

(57) ABSTRACT

Methods of dispensing an ingredient and measuring an amount of the ingredient dispensed, e.g., at a customer's location usually as the ingredient is used by the customer, in order to improve the dispensing process by adjusting future dispense cycles, accurately dispensing the ingredient, predicting an amount of ingredient to be dispensed.

8 Claims, 10 Drawing Sheets

(56) References Cited

U.S. PATENT DOCUMENTS

| | | |
|---|---|---|
| 2,319,739 A | 5/1943 | Kessler |
| 2,333,791 A | 11/1943 | Hutchinson |
| 3,091,327 A | 5/1963 | Lalley |
| 3,136,157 A | 6/1964 | Seed et al. |
| 3,412,254 A | 11/1968 | Meyer-Doering et al. |
| 3,526,334 A | 9/1970 | Ashton et al. |
| 3,743,598 A | 7/1973 | Field |
| 3,754,871 A | 8/1973 | Hessel et al. |
| 3,760,166 A | 9/1973 | Adams et al. |
| 3,772,193 A | 11/1973 | Nelli et al. |
| 3,774,056 A | 11/1973 | Sample et al. |
| 3,826,113 A | 7/1974 | Boraas et al. |
| 3,826,408 A | 7/1974 | Berndt et al. |
| 3,828,869 A | 8/1974 | Sellers et al. |
| 4,040,515 A | 8/1977 | Hessel et al. |
| 4,046,996 A | 9/1977 | Williams et al. |
| 4,076,146 A | 2/1978 | Lausberg et al. |
| 4,199,001 A | 4/1980 | Kratz |
| 4,211,517 A | 7/1980 | Schmid |
| 4,241,400 A | 12/1980 | Keifer |
| 4,247,396 A | 1/1981 | Buseing |
| 4,265,266 A | 5/1981 | Kierbow et al. |
| 4,307,787 A | 12/1981 | Raboud et al. |
| 4,353,482 A | 10/1982 | Tomlinson et al. |
| 4,373,418 A | 2/1983 | Rhodes et al. |
| 4,396,828 A | 8/1983 | Dino et al. |
| 4,402,426 A | 9/1983 | Faulkner et al. |
| 4,404,639 A | 9/1983 | McGuire et al. |
| 4,482,785 A | 11/1984 | Finnegan et al. |
| 4,486,910 A | 12/1984 | Saalmann et al. |
| 4,509,543 A | 4/1985 | Livingston et al. |
| 4,573,606 A | 3/1986 | Lewis et al. |
| 4,597,091 A | 6/1986 | Blake |
| 4,630,654 A | 12/1986 | Kennedy, Jr. |
| 4,632,198 A | 12/1986 | Uchimura |
| 4,660,667 A | 4/1987 | Uchimura et al. |
| 4,676,399 A | 6/1987 | Burckhardt |
| 4,690,230 A | 9/1987 | Ichimura et al. |
| 4,690,305 A | 9/1987 | Copeland |
| 4,697,243 A | 9/1987 | Moore et al. |
| 4,707,848 A | 11/1987 | Durston et al. |
| 4,711,370 A | 12/1987 | Goudy, Jr. et al. |
| 4,756,321 A | 7/1988 | Livingston et al. |
| 4,766,548 A | 8/1988 | Cedrone et al. |
| 4,770,859 A | 9/1988 | Heiser, Jr. |
| 4,826,661 A | 5/1989 | Copeland et al. |
| 4,837,811 A | 6/1989 | Butler et al. |
| 4,845,965 A | 7/1989 | Copeland et al. |
| 4,848,381 A | 7/1989 | Livingston et al. |
| 4,858,449 A | 8/1989 | Lehn |
| 4,867,196 A | 9/1989 | Zetena et al. |
| 4,908,190 A | 3/1990 | Maglio et al. |
| 4,938,240 A | 7/1990 | Lakhan et al. |
| 4,964,185 A | 10/1990 | Lehn |
| 4,969,011 A | 11/1990 | Faull et al. |
| 4,976,137 A | 12/1990 | Decker et al. |
| 4,980,292 A | 12/1990 | Elbert et al. |
| 4,999,124 A | 3/1991 | Copeland |
| 5,014,211 A | 5/1991 | Turner et al. |
| 5,014,877 A | 5/1991 | Roos |
| 5,024,352 A | 6/1991 | Gmür et al. |
| 5,036,479 A | 7/1991 | Prednis et al. |
| 5,038,807 A | 8/1991 | Bailey et al. |
| 5,040,699 A | 8/1991 | Gangemi |
| 5,043,860 A | 8/1991 | Koether et al. |
| 5,053,206 A | 10/1991 | Maglio et al. |
| 5,064,094 A | 11/1991 | Roos et al. |
| 5,115,842 A | 5/1992 | Crafts et al. |
| 5,136,281 A | 8/1992 | Bonaquist |
| 5,147,615 A | 9/1992 | Bird et al. |
| 5,203,366 A | 4/1993 | Czeck et al. |
| 5,208,930 A | 5/1993 | Chabard |
| 5,219,224 A | 6/1993 | Pratt |
| 5,222,027 A | 6/1993 | Williams et al. |
| 5,240,326 A | 8/1993 | Evanson |
| 5,268,153 A | 12/1993 | Muller |
| 5,279,448 A | 1/1994 | Hanlin et al. |
| 5,283,639 A | 2/1994 | Esch et al. |
| 5,294,022 A | 3/1994 | Earle |
| 5,316,195 A | 5/1994 | Moksnes et al. |
| 5,322,571 A | 6/1994 | Plummer et al. |
| 5,332,312 A | 7/1994 | Evanson |
| 5,345,379 A | 9/1994 | Brous et al. |
| 5,369,032 A | 11/1994 | Pratt |
| 5,370,267 A | 12/1994 | Schroeder |
| 5,389,344 A | 2/1995 | Copeland et al. |
| 5,390,385 A | 2/1995 | Beldham |
| 5,397,028 A | 3/1995 | Jesadanont |
| 5,400,018 A | 3/1995 | Scholl et al. |
| 5,404,893 A | 4/1995 | Brady et al. |
| 5,407,598 A | 4/1995 | Olson et al. |
| 5,411,716 A | 5/1995 | Thomas et al. |
| 5,419,355 A | 5/1995 | Brennan et al. |
| 5,427,748 A | 6/1995 | Wiedrich et al. |
| 5,497,914 A | 3/1996 | Maltsis |
| 5,500,050 A | 3/1996 | Chan et al. |
| 5,505,915 A | 4/1996 | Copeland et al. |
| 5,556,478 A | 9/1996 | Brady et al. |
| 5,580,448 A | 12/1996 | Brandreth |
| 5,584,025 A | 12/1996 | Keithley et al. |
| 5,584,079 A | 12/1996 | Wong et al. |
| 5,609,417 A | 3/1997 | Otte |
| 5,619,183 A | 4/1997 | Ziegra et al. |
| 5,625,659 A | 4/1997 | Sears |
| 5,625,908 A | 5/1997 | Shaw |
| 5,636,008 A | 6/1997 | Lobiondo et al. |
| 5,638,417 A | 6/1997 | Boyer et al. |
| 5,671,262 A | 9/1997 | Boyer et al. |
| 5,679,173 A | 10/1997 | Hartman |
| 5,681,400 A | 10/1997 | Brady et al. |
| 5,694,323 A | 12/1997 | Koropitzer et al. |
| 5,695,091 A | 12/1997 | Winings et al. |
| 5,724,261 A | 3/1998 | Denny et al. |
| 5,745,381 A | 4/1998 | Tanaka et al. |
| 5,757,664 A | 5/1998 | Rogers et al. |
| 5,758,300 A | 5/1998 | Abe |
| 5,759,501 A | 6/1998 | Livingston et al. |
| 5,761,278 A | 6/1998 | Pickett et al. |
| 5,762,096 A | 6/1998 | Mirabile |
| 5,769,536 A | 6/1998 | Kotylak |
| 5,777,895 A | 7/1998 | Kuroda et al. |
| H1743 H | 8/1998 | Graves et al. |
| 5,821,523 A | 10/1998 | Bunte et al. |
| 5,826,749 A | 10/1998 | Howland et al. |
| 5,827,486 A | 10/1998 | Crossdale |
| 5,839,097 A | 11/1998 | Klausner |
| 5,851,291 A | 12/1998 | Poterala et al. |
| 5,861,881 A | 1/1999 | Freeman et al. |
| 5,864,783 A | 1/1999 | Struck et al. |
| 5,875,430 A | 2/1999 | Koether |
| 5,885,446 A | 3/1999 | McGrew, Jr. |
| 5,887,975 A | 3/1999 | Mordaunt et al. |
| 5,897,671 A | 4/1999 | Newman et al. |
| 5,902,749 A | 5/1999 | Lichtwardt et al. |
| 5,913,915 A | 6/1999 | McQuinn |
| 5,931,877 A | 8/1999 | Smith et al. |
| 5,933,479 A | 8/1999 | Michael et al. |
| 5,939,974 A | 8/1999 | Heagle et al. |
| 5,945,910 A | 8/1999 | Gorra |
| 5,956,487 A | 9/1999 | Venkatraman et al. |
| 5,961,561 A | 10/1999 | Wakefield, II |
| 5,967,202 A | 10/1999 | Mullen et al. |
| 5,973,696 A | 10/1999 | Agranat et al. |
| 5,974,345 A | 10/1999 | Buck et al. |
| 5,975,352 A | 11/1999 | Spriggs et al. |
| 5,979,703 A | 11/1999 | Nystrom |
| 5,980,090 A | 11/1999 | Royal et al. |
| 5,987,105 A | 11/1999 | Jenkins et al. |
| 5,992,686 A | 11/1999 | Cline et al. |
| 6,003,070 A | 12/1999 | Frantz |
| 6,007,788 A | 12/1999 | Bellon et al. |
| 6,012,041 A | 1/2000 | Brewer et al. |
| 6,029,286 A | 2/2000 | Funk |
| 6,049,792 A | 4/2000 | Hart et al. |

(56) References Cited

U.S. PATENT DOCUMENTS

| | | |
|---|---|---|
| 6,061,668 A | 5/2000 | Sharrow |
| 6,073,124 A | 6/2000 | Krishnan et al. |
| 6,082,149 A | 7/2000 | Woods |
| 6,098,843 A | 8/2000 | Soberanis et al. |
| 6,120,175 A | 9/2000 | Tewell |
| 6,129,449 A | 10/2000 | McCain et al. |
| 6,133,555 A | 10/2000 | Brenn |
| 6,136,184 A | 10/2000 | King |
| 6,143,257 A | 11/2000 | Spriggs et al. |
| 6,164,189 A | 12/2000 | Anson |
| 6,167,358 A | 12/2000 | Othmer et al. |
| 6,220,312 B1 | 4/2001 | Hirsch et al. |
| 6,259,956 B1 | 7/2001 | Myers et al. |
| 6,321,204 B1 | 11/2001 | Kazami et al. |
| 6,330,499 B1 | 12/2001 | Chou et al. |
| 6,356,205 B1 | 3/2002 | Salvo et al. |
| 6,357,292 B1 | 3/2002 | Schultz et al. |
| 6,370,454 B1 | 4/2002 | Moore |
| 6,377,868 B1 | 4/2002 | Gardner, Jr. |
| 6,418,371 B1 | 7/2002 | Arnold |
| 6,438,471 B1 | 8/2002 | Katagishi et al. |
| 6,441,322 B1 | 8/2002 | Ash et al. |
| 6,463,940 B1 | 10/2002 | Thomas et al. |
| 6,472,615 B1 | 10/2002 | Carlson |
| 6,490,513 B1 | 12/2002 | Fish et al. |
| 6,547,097 B1 | 4/2003 | Cavallaro et al. |
| 6,561,381 B1 | 5/2003 | Osterheld et al. |
| 6,697,706 B2 | 2/2004 | Gardner, Jr. |
| 6,707,873 B2 | 3/2004 | Thompson et al. |
| 6,792,395 B2 | 9/2004 | Roberts |
| 6,896,140 B1 | 5/2005 | Perry |
| 6,987,228 B1 | 1/2006 | MacMichael et al. |
| 7,069,188 B2 | 6/2006 | Roberts |
| 7,128,215 B2 | 10/2006 | Danechi |
| 7,201,290 B2 | 4/2007 | Mehus et al. |
| 7,410,623 B2 | 8/2008 | Mehus et al. |
| 2001/0038018 A1 | 11/2001 | Bell et al. |
| 2001/0039501 A1 | 11/2001 | Crevel et al. |
| 2001/0047214 A1 | 11/2001 | Cocking et al. |
| 2001/0053939 A1 | 12/2001 | Crevel et al. |
| 2001/0054038 A1 | 12/2001 | Crevel et al. |
| 2002/0014496 A1 | 2/2002 | Cline et al. |
| 2003/0033156 A1 | 2/2003 | McCall |
| 2003/0033396 A1 | 2/2003 | McCall |
| 2003/0043688 A1 | 3/2003 | Peterson et al. |
| 2003/0195656 A1 | 10/2003 | Gardner, Jr. et al. |
| 2004/0015269 A1 | 1/2004 | Jungmann et al. |
| 2004/0088076 A1 | 5/2004 | Gardner, Jr. et al. |
| 2004/0162850 A1 | 8/2004 | Sanville et al. |
| 2004/0220844 A1 | 11/2004 | Sanville et al. |
| 2004/0226755 A1 | 11/2004 | Pottebaum et al. |
| 2004/0226956 A1 | 11/2004 | Brooks |
| 2004/0226959 A1 | 11/2004 | Mehus et al. |
| 2004/0230339 A1 | 11/2004 | Maser et al. |
| 2004/0232163 A1 | 11/2004 | Reinsch et al. |
| 2005/0065644 A1 | 3/2005 | Gardner, Jr. et al. |
| 2005/0072793 A1 | 4/2005 | Mehus et al. |
| 2005/0102059 A1 | 5/2005 | Gardner et al. |
| 2005/0269348 A1 | 12/2005 | Limback et al. |
| 2006/0173576 A1 | 8/2006 | Georg et al. |
| 2010/0163573 A1 | 7/2010 | Wegelin et al. |

FOREIGN PATENT DOCUMENTS

| | | |
|---|---|---|
| JP | 06226068 | 8/1994 |
| JP | 09066995 | 3/1997 |
| JP | 09066999 | 3/1997 |
| JP | 11502932 | 3/1999 |
| JP | 11156101 | 6/1999 |
| WO | 98/26704 A1 | 6/1998 |
| WO | 03/059143 A1 | 7/2003 |

OTHER PUBLICATIONS

Novalink™ OverView™ Program Pricing, undated, 1 pg.
Nova Controls, "ORION Liquid Laundry Supply Dispenser," Feb. 1989, 5 pp.
Novalink™ Laundry Information System, ControlMaster Version 2.0 for Windows User's Guide, 2000, 39 pp.
Persyst Inc., "LDAS-2000 Remote Information Control and Management System for the Commercial Laundry and Vending Industry," undated, 4 pp.
Persyst Inc., "Dial-a-Wash Automatic Laundry Room Attendant for Apartment and Complex Laundry Rooms," undated, 2 pp.
PowerPoint Presentation: "ECOLAB® Aramark Uniform Services Joining Forces for Service Excellence," 1998, 69 pp.
T-JET™ 2000 PC, "Wash-Aisle Productivity Manager Software Guide," ECOLAB® Textile Care Division, undated, 29 pp.
Sample Reports, Nova Controls, Oct. 1997, 8 pp.
Sample Reports, Novalink™ System, Jan. 1996, 9 pp.
Nexgen SI, Inc., "*InTouch* Water Treatment Information Management Solution," Mar. 29, 1999, 59 pp.
NOVALINK™ brochure: "Laundry Information System: Overview Reports," Dec. 13, 1995, 6 pp.
DIVERSEY, Diverlog-L Enhanced "DLE—Production Summary Reports," Apr. 1990, 5 pp.
DIVERSEY, Diverlog-L Enhanced "DLE Set-up Report," Apr. 1990, 7 pp.
DIVERSEY, Diverlog-L Enhanced "DLE—Single Cycle Reports," Mar. 1990, 5 pp.
Clax Diverflow System, "Advanced Central Dosing Technology for Laundries," copyright DiverseyLever 1998, 3 pp.
ECOLAB® Inc., product brochure: "We'd like to make a couple of things perfectly CLEAR," copyright 1998, 4 pp.
ECOLAB® Balancer. com, MRE, Jun. 4, 1997, 4 pp.
ECOLAB® Inc., product brochure: "Relax. We've Got Your Pool Concerns Under Control," copyright 1998, 4 pp.
Prosecution history from U.S. Appl. No. 10/436,454, dated Feb. 8, 2005, through Jan. 18, 2011, 205 pp.
Prosecution history from U.S. Appl. No. 10/437,257, dated Mar. 8, 2005, through Dec. 1, 2006, 81 pp.
Prosecution history from U.S. Appl. No. 10/843,230, dated Feb. 8, 2005, through Dec. 17, 2010, 173 pp.
Prosecution history from U.S. Appl. No. 10/843,219, dated Feb. 9, 2007, through May 1, 2008, 94 pp.
Prosecution history from U.S. Appl. No. 11/713,964, dated Mar. 10, 2010, through Nov. 19, 2010, 36 pp.
Prosecution history from U.S. Appl. No. 11/954,425, dated Feb. 17, 2009, through Jan. 6, 2010, 59 pp.
Prosecution history from U.S. Appl. No. 12/711,892, dated Feb. 2, 2010, through Feb. 2, 2011, 8 pp.
Prosecution history from U.S. Appl. No. 11/799,692, dated Aug. 23, 2010, through Jun. 7, 2012, 85 pp.
Prosecution history from U.S. Appl. No. 12/683,666, dated Aug. 21, 2012, through Apr. 17, 2013, 37 pp.
Prosecution history from U.S. Appl. No. 12/567,266, dated Jun. 20, 2011, through Nov. 28, 2012, 69 pp.
Prosecution history from U.S. Appl. No. 11/570,411, dated Apr. 7, 2009, through Sep. 13, 2013, 121 pp.
Response to Office Action dated Sep. 19, 2013 filed on Dec. 19, 2013. 12 pp.
Office Action from U.S. Appl. No. 11/570,411, dated Mar. 11, 2014, 17 pp.
Amendment in Response to Office Action mailed Mar. 11, 2014, from U.S. Appl. No. 11/570,411, filed Jun. 11, 2014, 13 pp.
Notice of Allowance from U.S. Appl. No. 11/570,411, mailed Aug. 6, 2014, 5 pp.

METHODS OF DISPENSING

CROSS REFERENCE TO RELATED APPLICATIONS

This application is a divisional of U.S. application Ser. No. 10/436,454, filed May 12, 2003, the entire content of which is incorporated herein by reference.

TECHNICAL FIELD

This invention relates to methods of dispensing a chemical product.

BACKGROUND

Dispensing systems to dispense an ingredient for a commercial purpose have been widely used in many industries. For example, in the restaurant industry, warewashing systems are employed to rapidly wash large quantities of eating utensils, plates, pots, pans, glassware, etc. In another example in the hotel industry, linens, towels, clothing and the like are washed in commercial cleaning systems. Such systems commonly employ dispensers to dispense chemicals, such as detergents, to effectively perform the washing function.

Many types of dispensers and control systems for such dispensers have been utilized. Such dispensers, control systems and methods for controlling such dispensers have utilized a variety of techniques. As one example, such methods may dispense a predetermined amount of the ingredient into the cleaning apparatus for each cycle of the apparatus. Other systems and methods attempt to determine when the ingredient needs to be replenished in the cleaning apparatus by measuring a characteristic of the cleaning apparatus, e.g., measuring the conductivity of a use solution to determine when additional detergent needs to be added.

Many of these prior art dispensing methods fail to effectively manage the amount of ingredient dispensed.

SUMMARY OF THE INVENTION

In one example, the disclosure is directed to a method of dispensing a requested weight of an ingredient from a container, comprising measuring an initial weight of the ingredient in the container, dispensing at least some of the ingredient from the container during a dispense cycle by eroding the ingredient with a diluent for a predetermined period of time, waiting for a lag time to allow the diluent to drain from the container, measuring, after the lag time has elapsed, a final weight of the ingredient in the container, determining a dispensed weight of the ingredient dispensed from the container by comparing the final weight with the initial weight, comparing the dispensed weight with the requested weight, and adjusting the predetermined period of time for a subsequent dispense cycle based on the comparison.

In another example, the disclosure is directed to a method of dispensing a requested amount of an ingredient, comprising determining an initial weight of the ingredient, activating a dispenser to dispense at least some of the ingredient during a dispensing cycle, determining a current weight of the ingredient during the dispensing cycle, determining a current weight loss of the ingredient based on the initial weight and the current weight, determining whether the dispense cycle is a first dispense cycle associated with the container, if the dispense cycle is the first dispense cycle, determining an offset based on a predetermined new capsule startup value, and deactivating the dispenser when the determined weight loss equals the difference between a maximum weight measured during the dispensing cycle and the requested amount minus the offset.

DETAILED DESCRIPTION

Figure 1:
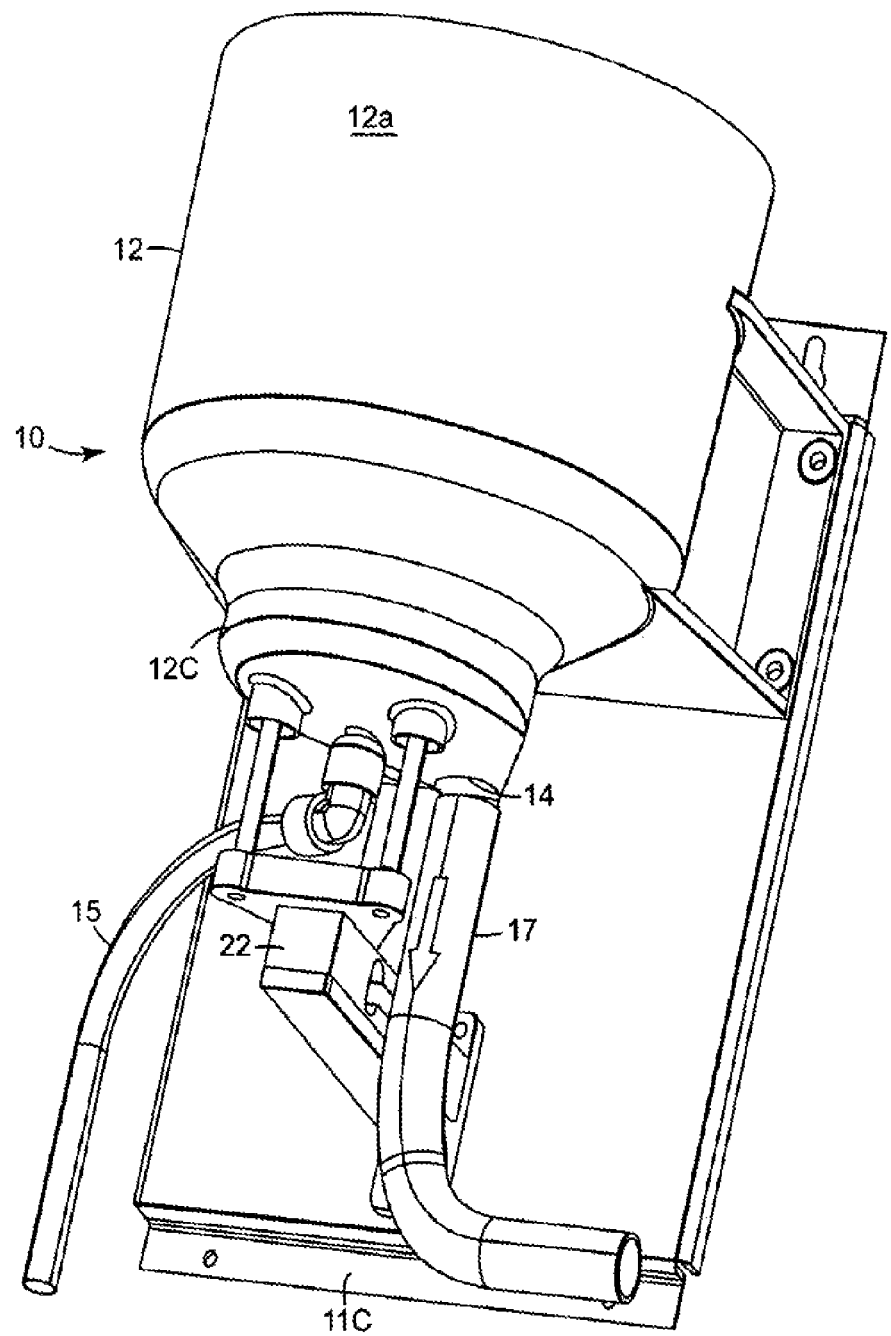
FIG. 1 is an illustration of a dispenser in which some or all of methods of the present invention may find usefulness.

The methods of the present invention can be described, as an example, being used in conjunction with a mass based dispensing system such as a dispensing system described in U.S. Pat. No. 7,201,290, to Mehus et al., issued Apr. 10, 2007 and entitled "Method and Apparatus For Mass Based Dispensing," the entire content of which is incorporated herein by reference. The dispenser described in such co-pending patent application is shown generally in FIG. 1. Dispenser 10 includes a housing 12 that has an outer wall 12a having a cavity (not shown). Outer wall 12a has a larger diameter at the top so as to accommodate capsule (not shown). The capsule, in a preferred embodiment, contains a solid block of an ingredient to be dispensed. Inlet hose 15 allows a diluent to be sprayed into capsule and onto the block of ingredient to be dispensed effectively eroding a portion of the block of ingredient. Sump region 12c provides for a collection that region for a use solution of the eroded ingredient and the diluent. Hose 17 is connected to outlet 14 allowing the use solution to be directed to a desired location. Load cell 22 measures that combined weight of capsule, the block of ingredient and any diluent contained in capsule.

Dispenser 10 operates by spraying a diluent through inlet host 15 into capsule and onto the block of ingredient. As the block of ingredient is eroded, a mixture of eroded ingredient and diluent is discharged from dispenser 10 through hose 17. Load cell 22 accurately measures the combined weight before the diluent is sprayed onto the block of ingredient, while the diluent is sprayed onto the block of ingredient and after the diluent is sprayed onto the block of ingredient.

Figure 2:
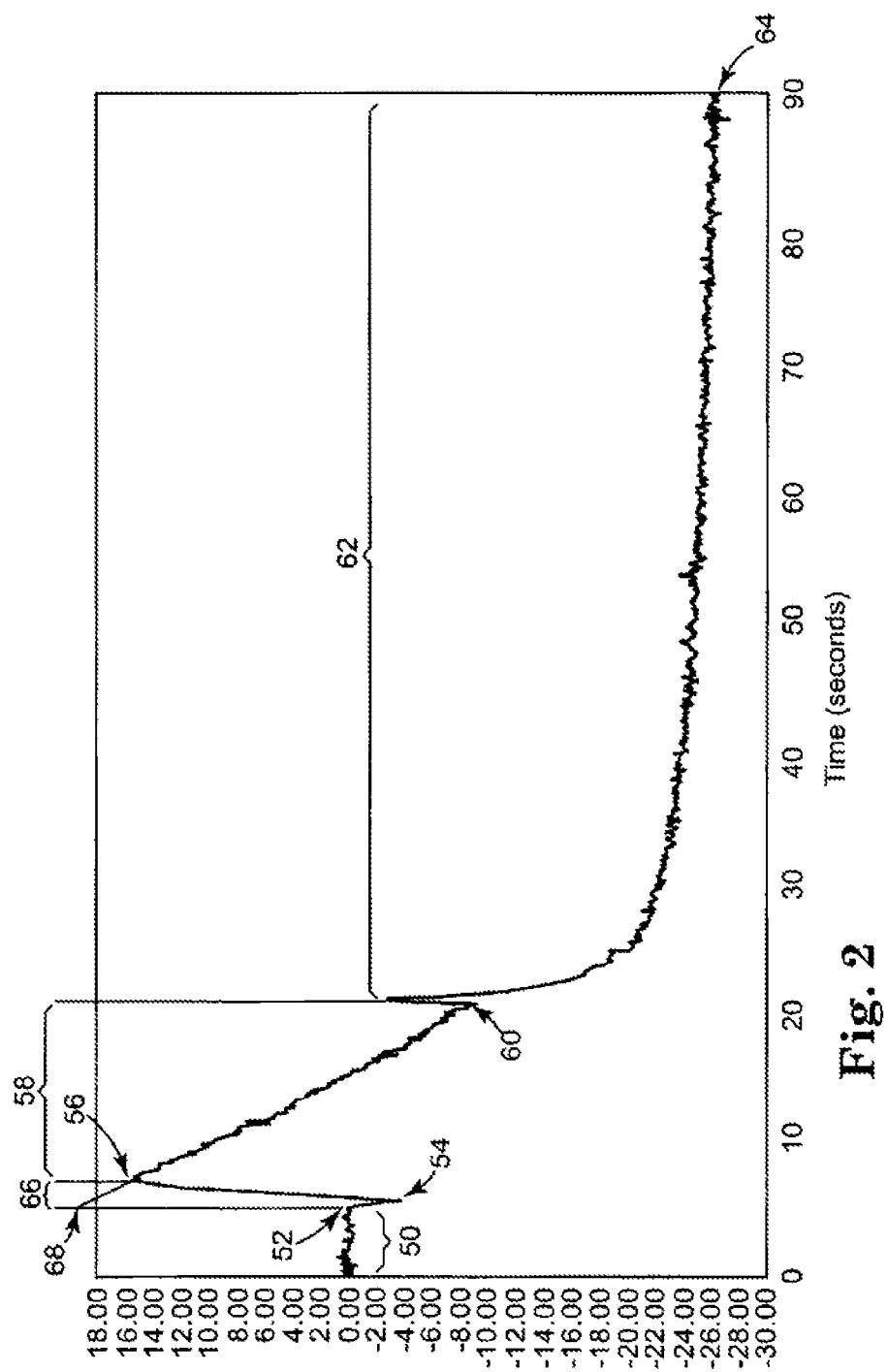
FIG. 2 is a chart illustrating the weight of a dispensing ingredient of the dispenser of FIG. 1.

FIG. 2 is a chart illustrating the effect of the spray of diluent onto the block of ingredient in the dispenser of FIG. 1. The mantissa is time and the ordinate is weight in grams. Time 50 before the initiation of spray represents the starting combined weight, netted out at approximately zero (0) grams, for purposes of illustration. Spray is initiated at time 52 at which point two things begin to happen. First, pressure from the diluent sprayed on the underside of the block of ingredient relieves some of the combined weight from load cell 22. Second, the added weight from diluent accumulating in capsule tends to cause an increased combined weight. Thus, the combined weight on load cell 22 initially decreases until time 54 at which point the combined weight reaches an initial minimum of approximately minus four (−4) grams. Following time 54, the added weight of the diluent in capsule causes the combined weight to rather significantly increase. Over time, however, the added weight of the diluent in capsule tends to stabilize as the block of ingredient is eroded. As the block of ingredient is eroded, its weight decreases. Thus, at time 56 the combined weight reaches a maximum at approximately sixteen (16) grams. Following time 56 the block of ingredient continues to be eroded as the diluent continues to spray. Since the added weight of the diluent in capsule has stabilized, the combined weight continues to decrease during time 58 until the spray is discontinued. The spray of diluent is discontinued at time 60 causing a momentary weight gain for the combined weight as the upward pressure on the block of ingredient is discontinued. Following a momentary weight gain cause by the lack of upward pressure on the block of ingredient by the spray of diluent, diluent continues to drain from capsule during time period 62 resulting in the near final weight at time 64 of approximately minus twenty-six (−26) grams.

The difference between the starting weight at time 50 of approximately zero (0) grams and the ending weight of approximately minus twenty-six (−26) grams, once the diluent has drained from capsule, of twenty-six (26) grams represents the amount of ingredient dispensed. However, note that the difference between the maximum weight of approximately sixteen (16) grams and the weight at time 60 of approximately minus nine (−9) grams when spray is discontinued is only twenty-five (25) grams. This is because ingredient was eroded from the block of ingredient during time 66, between time 52 when spray is begun and time 56 when the maximum is measured, and also during time 62 as diluent drains from capsule.

Figure 3:
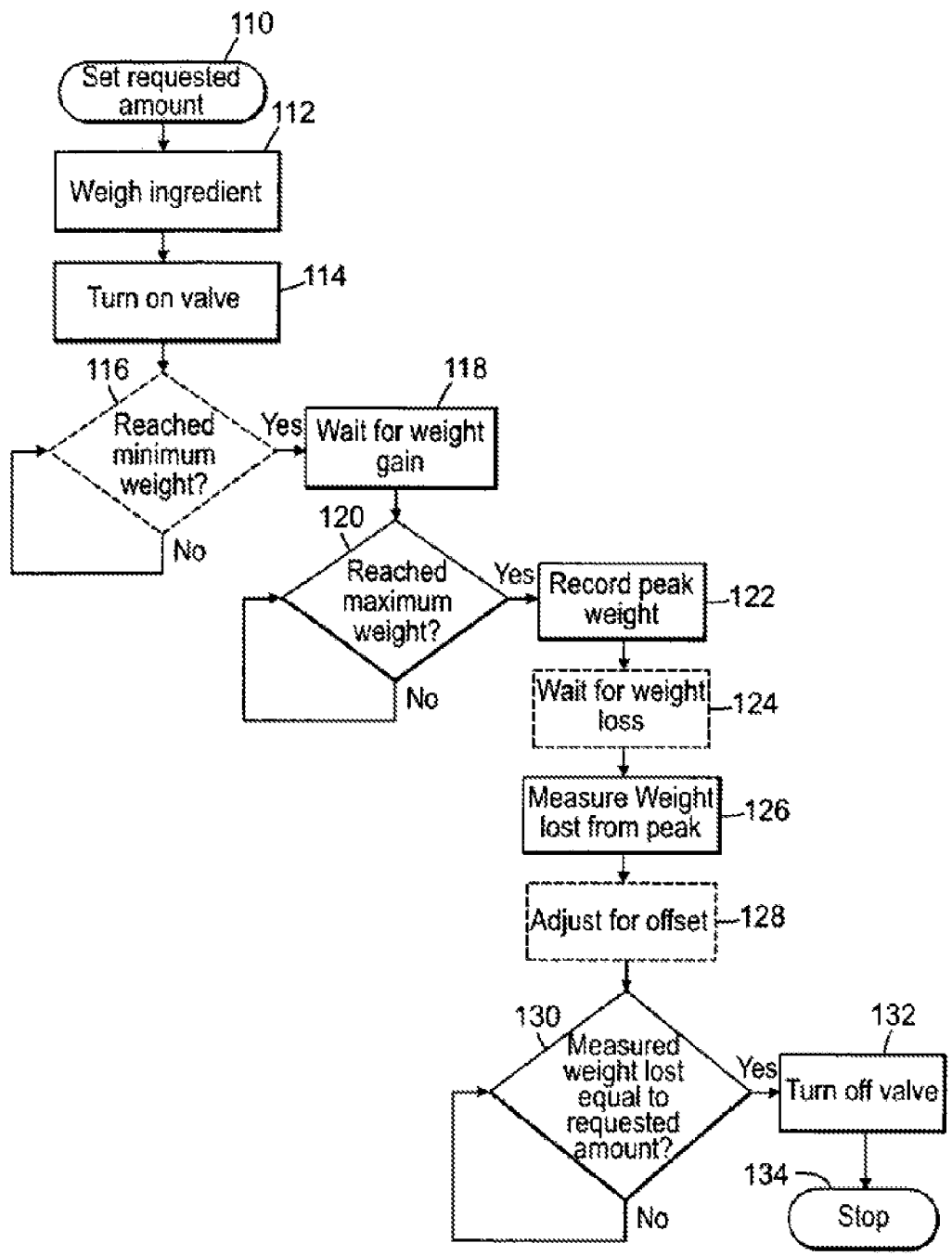
FIG. 3 is a flow chart illustrating an embodiment of the invention in which an ingredient is dispensed by eroding the ingredient with a diluent.

This process can be more readily understood with reference to the flow chart of FIG. 3. A requested amount of the ingredient requested is set (110). Load cell 22 weighs the ingredient (112). A valve is turned on (114) at time 52 initiating the spray of diluent against the block of ingredient. Optionally, the process waits (116) for a minimum weight at time 54 to be reached. The process waits (118) for diluent being added by spray to accumulate in capsule and increase the combined weight. Note that if the step represented by (116) is omitted, it is still proper to wait for weight gain (118). Alternatively, if the step represented by (116) is not omitted then it is no longer necessary to wait for weight gain and the step represented by (118). Alternatively, the steps represented by both (116) and (118) could be omitted in the process could continue directly to (120). In (120), the method searches for a maximum combined weight at time 56 and, once found, records that peak weight (122). Again optionally, the process waits for weight loss (124). Load cell 22 measures (126) the amount of weight lost from the maximum or peak weight recorded. Optionally, the process adjusts for an offset (128) which is explained below. The process determines (130) whether the measured weight lost is equal to an amount which will result in a dispensed amount of ingredient which equals the requested amount. When such a determination is made, the valve is turned off (132) discontinuing the spray of diluent against the block of ingredient. The process stops (134) until the process is repeated by again setting a requested amount (110).

Since some ingredient will be eroded from the block of ingredient during time 66 (between time 52 when spray is initiated and time 56 when weight loss begins to be recorded) and during time 62 (while remaining diluent drains from capsule), the amount of weight lost from capsule during time 58 does not necessarily equal the total weight of the ingredient eroded and, hence, dispensed. However, an amount of the ingredient which is additionally dispensed during time 66 and time 62 can be calculated and/or estimated by a variety of means. For example, this amount can be determined empirically from previous dispensed cycles. Alternatively, the slope of curve 48 during all or a portion of time 58 may be determined and an original maximum 68 may be determined by regression to account for an amount of the ingredient eroded during time 66. The amount of additional ingredient eroded during times 66 and 62 can be accounted for in the method (128) by adjusting the time 60 at which the spray of the diluent is discontinued. For example, if it is determined that the additional amount of the ingredient dispensed during time periods 66 and 62 is equal to approximately one (1) gram, then time 60 can be adjusted to turn off the spray of diluent when the measured weight loss is equal to the requested amount of ingredient minus one (1) gram.

Figure 4:
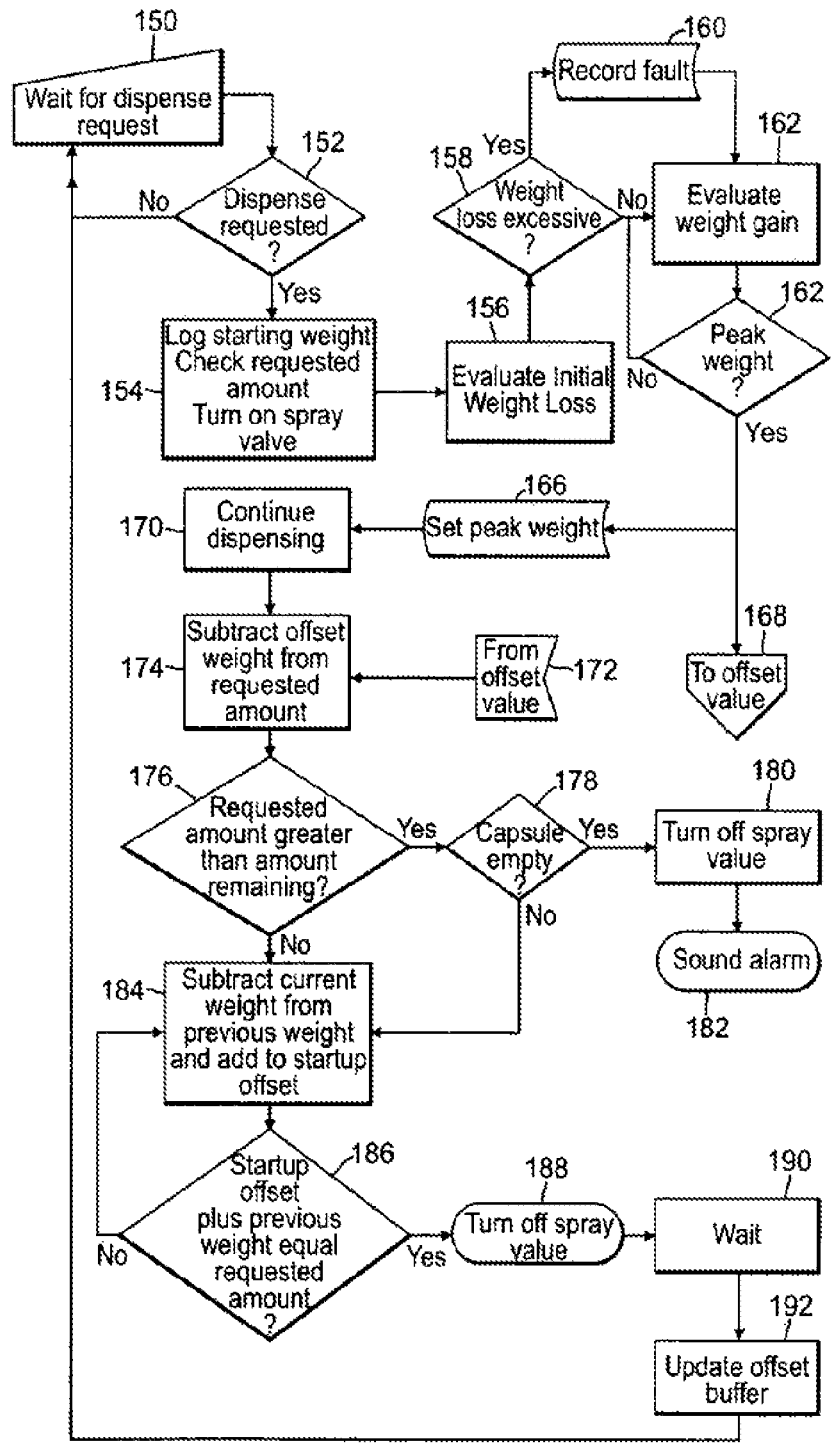
FIG. 4 is a flow chart illustrating a first portion of a more detailed preferred embodiment of the method illustrated in FIG. 3.

FIG. 4 is a flow chart illustrating a more detailed process. The process starts at (150) waiting for a dispense request. A determination is made at (152) whether or not a dispensed request has occurred. The starting weight is logged, the requested amount is determined and the diluent spray valve is turned on (154). The initial weight loss is evaluated (156). If the weight loss is excessive (158) a fault is recorded (160). The weight gain is evaluated (162) to determine if a peak weight has been reached (164).

If a peak weight has been reached, the peak weight is recorded (166) and a branch is made to compute an offset value (168). Dispensing continues (170) and the offset (from offset value in 172) is subtracted (174) from the requested amount. If the requested amount is greater (176) than the amount remaining, a determination is made (178) whether the capsule is empty. If the capsule is empty, the spray valve is turned off (180) and an alarm is sounded (182). If the capsule is not empty or if the requested amount is still greater than the amount remaining, the current weight is subtracted from the previous weight and added to the startup offset (184). If the startup offset plus the previous weight equals the requested amount (186), the spray valve is turned off (188), the process waits (190) and updates the offset buffer (192) before returning to the wait for dispense request at 150. However, if (in 186) the startup offset plus the previous weight is not equal to the requested amount, and the process returns to (184) and the current weight is again subtracted from the previous weight and added to the startup offset (184).

Figure 5:
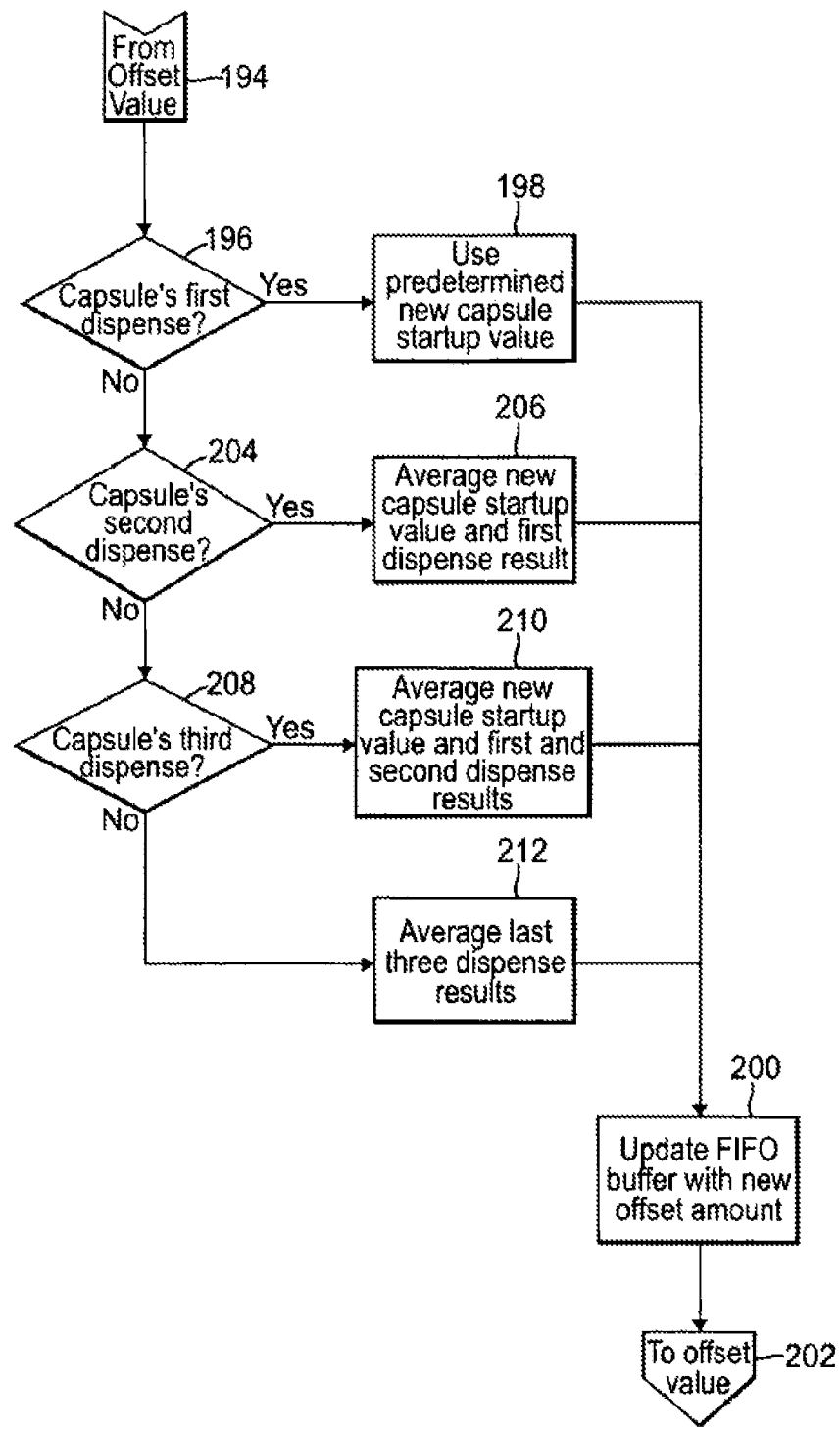
FIG. 5 is a flow chart illustrating a second portion of the method of FIG. 4.

FIG. 5 is a flow chart illustrating the offset value calculation from the flow chart illustrated in FIG. 4. From the offset value in FIG. 4 (194), the process determines whether this is the capsule's first dispense cycle (196). If it is, the process uses a predetermined new capsule startup value (198) before updating the FIFO buffer with the new offset amount (200) and returning (202) to the offset value in FIG. 4. If however (196) it is not the capsule's first dispense cycle, the process determines (204) if it is the capsule's second dispense cycle. If it is, an average (206) between the predetermined new capsule startup value and an empirical result from the first dispense cycle is sent to the FIFO buffer (200) and the process returns to FIG. 4 (202). If however (204) it is not the capsule's second dispense cycle, the process determines (208) if it is the capsule's third dispense cycle. If it is, an average (210) of a new capsule startup value and empirical result from the first and second dispense cycles is sent to the FIFO buffer (200) and the process returns to FIG. 4 (202). If however (at 208) it is not the capsule's third dispense cycle, then an average (212) of the empirical result from the capsule's last three dispensed cycles are used as an offset and sent to the FIFO buffer (200) and the process returns to FIG. 4 (202).

Figure 6:
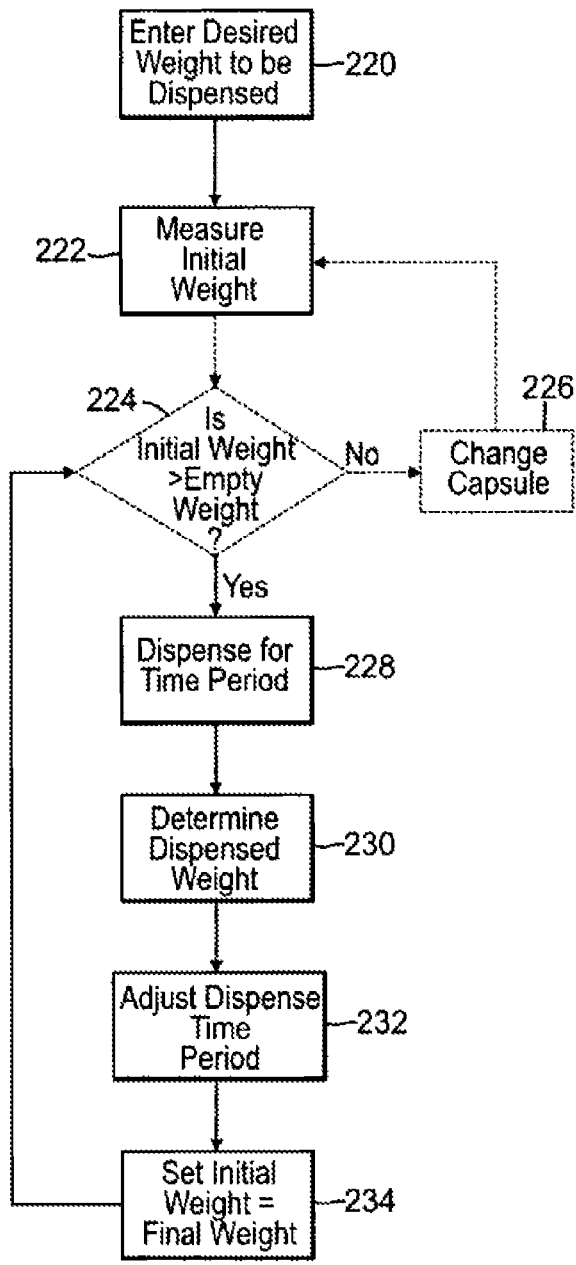
FIG. 6 is a flow chart illustrating an embodiment of the invention in which an ingredient is dispensed based on the result of a previous dispense cycle.

An alternative embodiment of a method of the present invention is illustrated in the flow chart of FIG. 6 which can be utilized, for example, in a dispenser which dispense as an ingredient for a predetermined period of time in each of a plurality of cycles. A desired weight of an amount of the ingredient to be dispensed is determined (220). The initial weight is measured (222). A determination is made (224) on whether the initial weight is greater than the weight of an empty capsule. If the initial weight is not greater than the weight of an empty capsule, the capsule may be changed (226) and the process again measures the initial weight (222). If however the initial weight is greater than the empty weight, the ingredient is dispensed (228) for the predetermined period of time. Following dispensing, the amount of dispensed ingredient is determined (230). If the amount actually dispensed should disagree with the desired amount to be dispensed, the period of time for the next dispense period (228) is appropriately adjusted (232). The initial weight is then set to be equal to the final weight (234) to properly enable the next dispense cycle.

Figure 7:
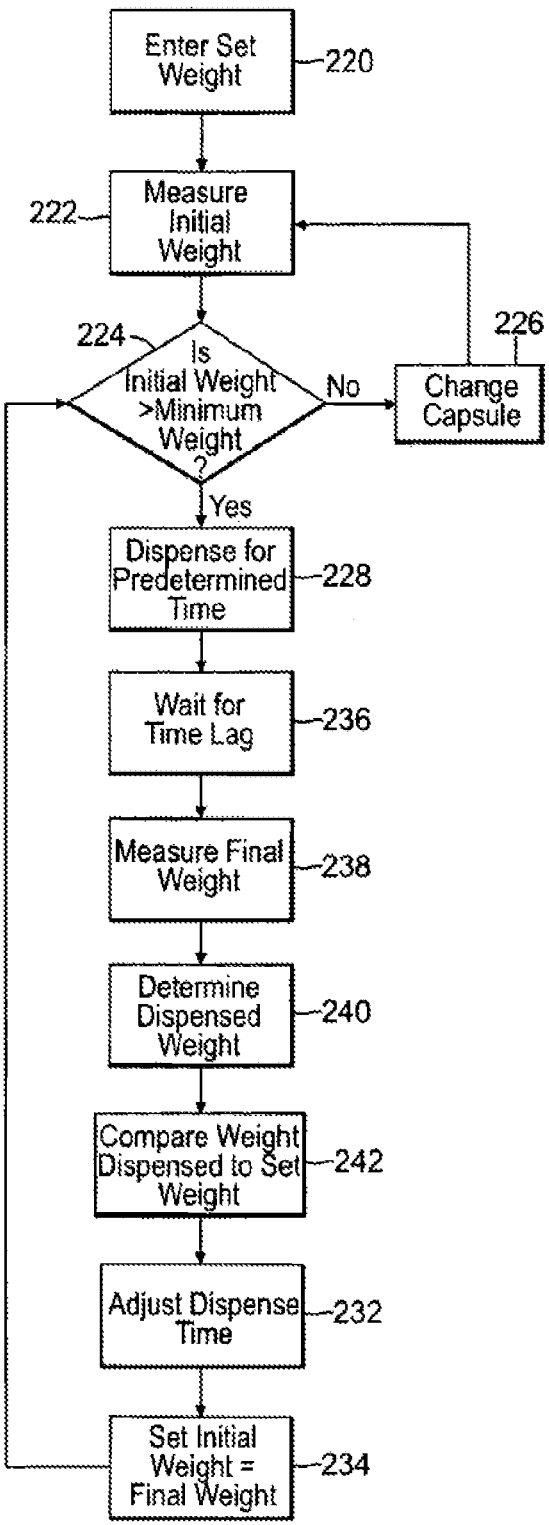
FIG. 7 is a flow chart illustrating a more detailed preferred embodiment of the method illustrated in FIG. 6.

FIG. 7 is a flow chart illustrating a more detailed method of FIG. 6. Again, the weight to be dispensed is set (220) and the initial weight is measured (222). Similarly, a determination (224) is made on whether the capsule is empty and whether the capsule should be changed (226). Also similarly, the ingredient is dispensed for a predetermined period of time (228). Following dispensing, the process waits (236) for any remaining diluent to drain from the capsule. The final weight is measured (238) and the dispensed weight is determined (240). The weight dispensed is compared (242) to the set weight and the predetermined period of time to dispense for the next cycle is adjusted (232) appropriately. As an example, if the amount dispensed is greater than the set amount, then the period of time to dispense would be adjusted downward. However, if the amount dispensed is less than the set amount, then the period of time to dispense would be adjusted upward. And, of course, if the amount dispensed equals the set amount no adjustment need be made. The initial weight is then set to be equal to the final weight (234) to properly enable the next dispense cycle.

Figure 8:
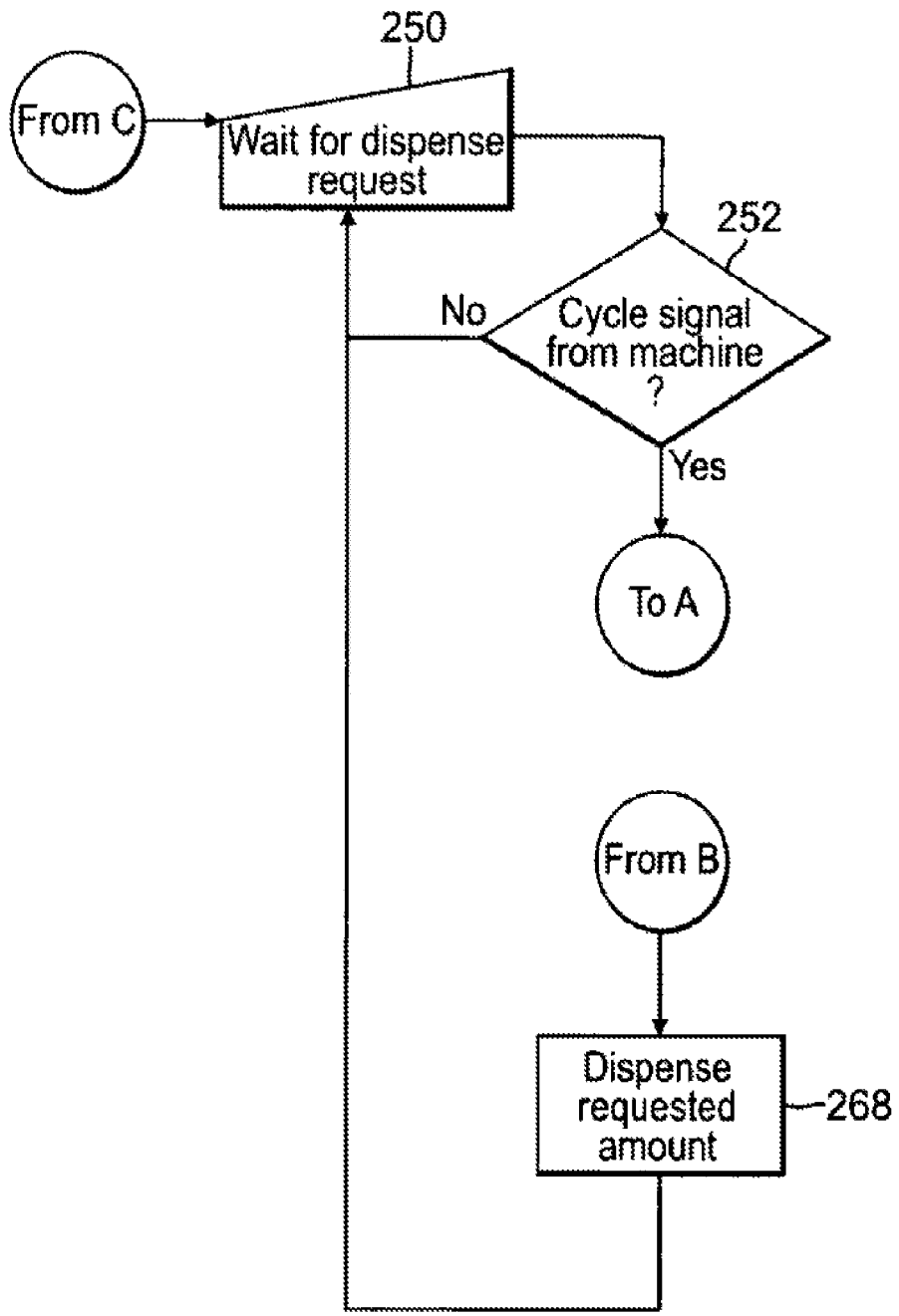
FIG. 8 is a flow chart illustrating a first portion of an embodiment of the invention in which an amount of an ingredient is dispensed based upon a predicted amount of the ingredient needed to maintain an effectiveness of the ingredient.
Figure 9:
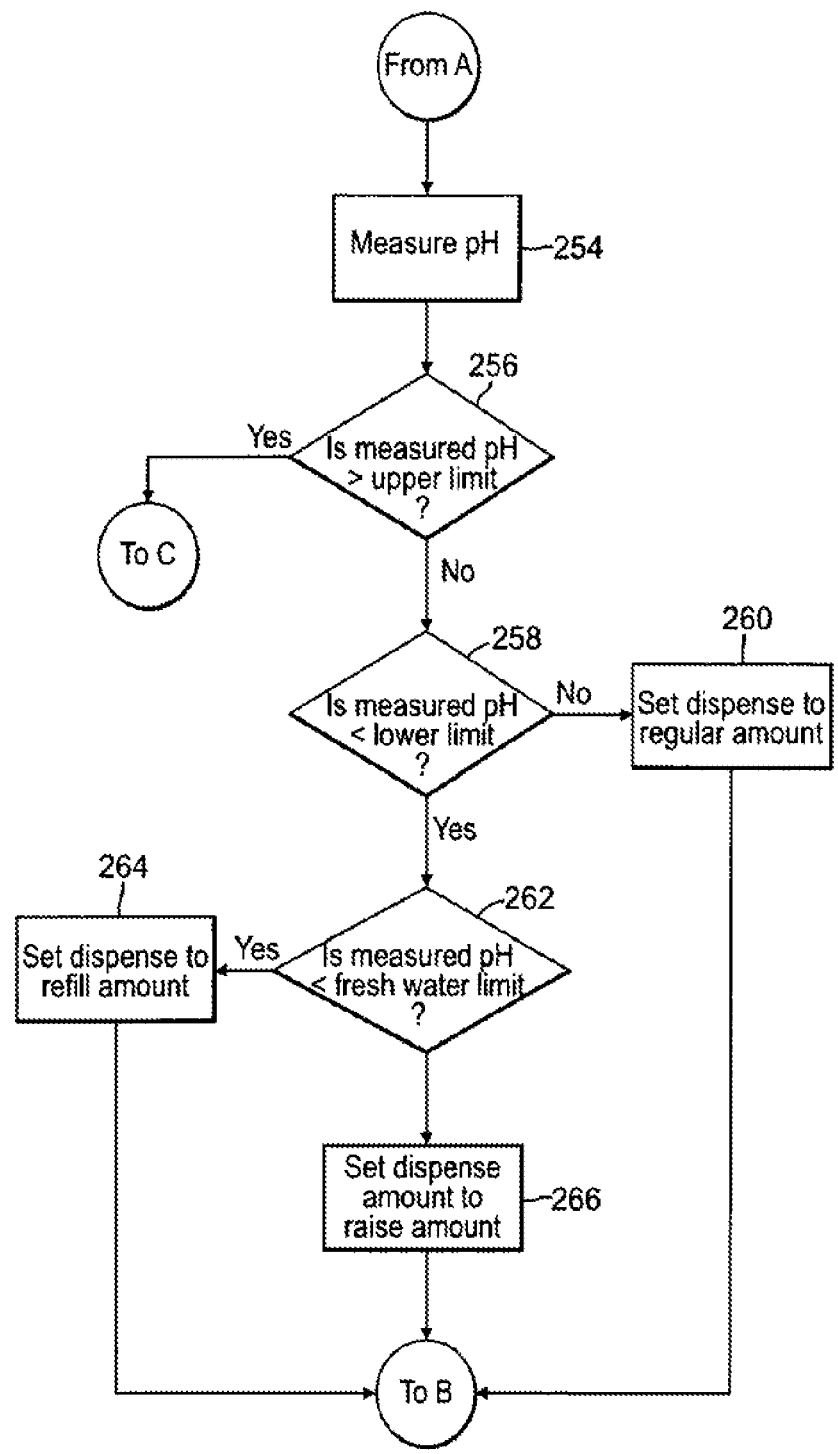
FIG. 9 is a flow chart illustrating a second portion of the method of FIG. 8.

An alternative embodiment of a method of the present invention is illustrated in the flow chart of FIG. 8 and FIG. 9 which can be utilized in any of the dispensers described or other dispensers. The process first waits for a dispense request (250) using the determination (252) based on whether a cycle signal has been received. Once a cycle signal is received, the process measures a factor which, at least in part, is indicative of the effectiveness of the ingredient being dispensed into the machine in which the ingredient is utilized. In one example in a machine in which the ingredient is dispensed into a use solution in a sump, a measurement of the pH of the use solution is indicative of an amount of detergent (for example, an alkaline detergent) contained in the use solution. Thus, by measuring a factor such as pH, a dispenser can predict an amount of ingredient, in this case detergent, which should be dispensed into the machine. It is recognized and understood that the pH of a use solution is just an example of one of many factors which may be indicative of the effectiveness of the ingredient being dispensed. For example with warewashing machines, other examples could include temperature, turbidity, conductivity, water pressure, or another factor not related to the use solution per se such as a degree of soiling of the dishes or the length of time since the last cycle.

In FIG. 9, the pH is measured (254) and a determination (256) on whether the measured pH is greater than an upper limit is made. If the pH is greater than the upper limit, the machine already has too much detergent, the present dispense cycle is skipped and the process returns (250) to wait for the next dispense request. If, however, the measured pH is not greater than the upper limit, a determination (258) is made on whether the pH is lower than a lower limit. If not, then the detergent amount is with in a normal range and the process dispenses (260) a regular amount of detergent for the current dispense cycle. If however, the measured pH is lower than a lower limit, then a determination is made (262) on whether the pH is so low that it is below a fresh water limit which would indicate that the machine's sump has been drained and refilled with fresh water. If it is, a larger, refill amount of detergent is dispensed (264). If it is not, the amount of detergent is below the normal range but not so low as to require a refill amount dispense amount. In this case, the regular dispense amount is increased (266) to account for the low amount of detergent. Following (260), (264) and (266), the process returns to FIG. 8 and dispenses (268) the requested amount of detergent.

Figure 10:
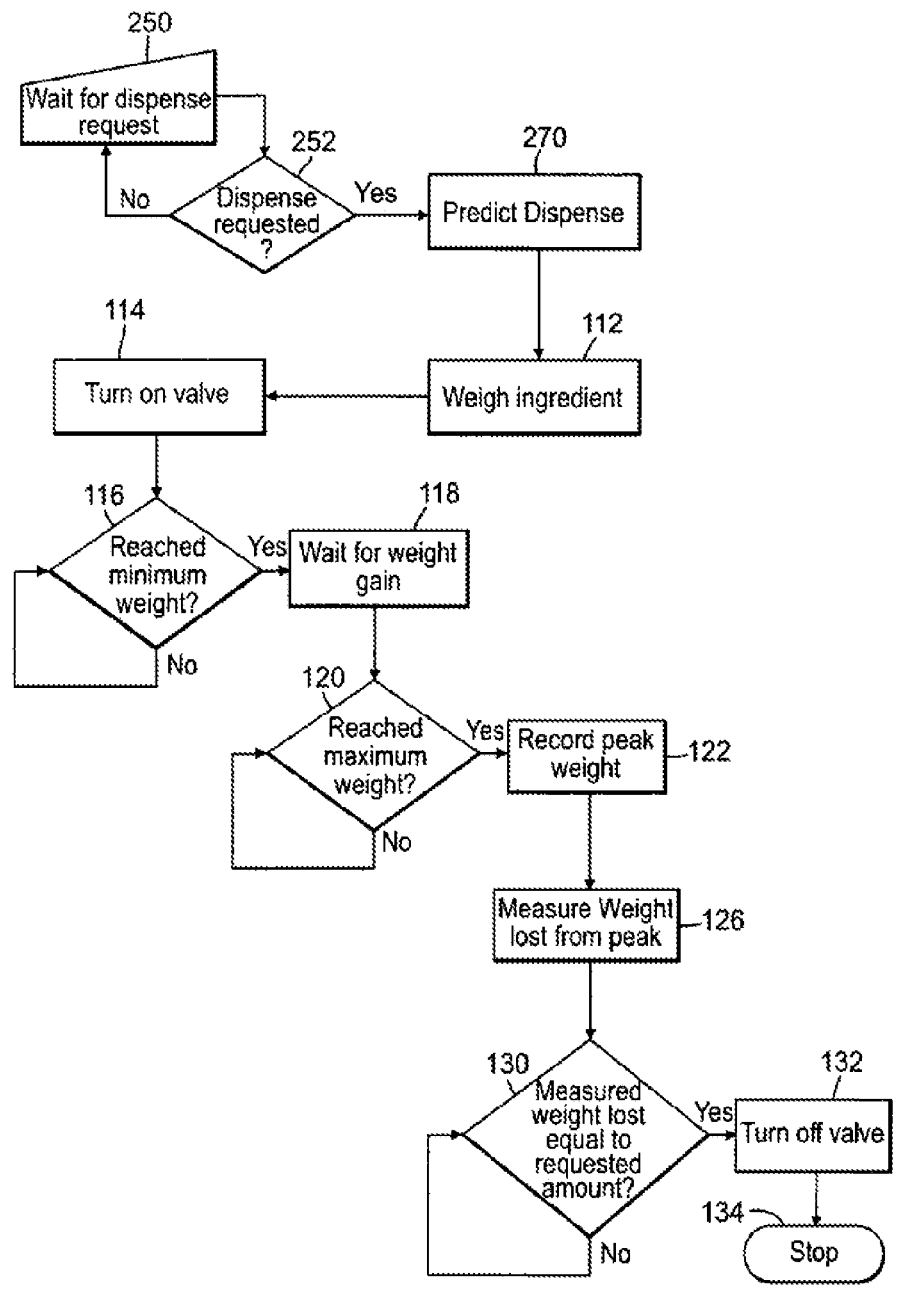
FIG. 10 is a flow chart illustrating an alternative embodiment of the method illustrated in FIG. 8 and FIG. 9.

FIG. 10 is a flow chart illustrating generally how the predictive process of FIG. 9 can be integrated in a dispensing method previously illustrated in FIG. 3. Instead of setting the amount of ingredient to be dispensed (as is done in FIG. 3), the process waits for a dispense request (250) and determines (252) whether a dispense cycle has been requested. If a dispense cycle has been requested, the amount of the ingredient which needs to be dispensed is predicted (270) using the techniques illustrated in FIG. 9. Essentially having substituted the predictive process of FIG. 9 for the manual setting of FIG. 3, the process of FIG. 10 continues essentially identical to the process illustrated in FIG. 3 beginning at (112) without optional steps represented by (124) and (128).

While the methods of this invention have been described throughout this description is dispensing an ingredient useful or utilized in an apparatus in the cleaning industry, for example a warewashing machine, it is to be recognized and understood that the methods of the present invention have usefulness in other applications as well.

A description of alternatives methods of dispensing related to the present invention are described in co-pending U.S. patent application Ser. No. 10/436,888, entitled "Methods of Managing Based on Measurements of Actual Use of Product," by Bryan Maser et al, the entire content of which is incorporated herein by reference.

The present invention has applicability in many areas in addition to those already discussed. The following is a list of at least some of the areas in which the invention may be used. In the area of pest elimination dispensing equipment, a load cell could be utilized to measure a pre-set amount of ready-to-use insecticide which would enable the user to document proof of delivery for regulatory compliance, while ensuring a consistent dose was used for each application. Use in the vehicle cleaning market could encompass the use of a chemical measurement device for a vehicle care product dispenser. The product could be in a solid, liquid or gel form. Delivery would be by conventional means such as a recirculating system for solid products or pump systems for liquids or gels. The load cell would measure precise weight changes in the product being delivered from a concentrate to create a ready-to-use solution or an intermediate solution that can be diluted at a user's convenience. The prior art procedures require chemical or volumetric measurements by operators of product usage to ensure reproducible product delivery. As each product type varies greatly in chemical components for vehicle cleaning products, different chemical tests need to be developed and validated for each new product. Batch to batch variations in solid dissolution rates require very stringent quality control measures and greatly restrict new product development of solid systems. Large variations in product use temperature due to seasonal temperature variations in the vehicle cleaning market have negative effects on liquid product viscosities. Water pressure variations within vehicle cleaning sites result in wide changes in product delivery as many dilution systems are based on siphon technology. These variations often result in unacceptable differences in product delivery. All of the variations require human intervention to adjust the chemical delivery system. The use of the load cell technology would permit reproducible delivery of product regardless of chemical composition. This presents the possibilities of greater flexibility and product formulation. Concerns about variation in solid product solubility differences or liquid viscosity changes with temperature would be eliminated as only weight changes are measured. Simplicity of the dispenser design would also result as the same dispenser technology could be used for many product chemistries since chemical measurement systems do not need to be taken into account for each product.

Still another area where the present invention could be utilized is in the janitorial and health care areas. The janitorial business would be able to utilize the technology of the present invention for accurately dispensing two component chemistries as well as cross linking chemistries for floor care. For health care, the present invention would be able to be utilized for proof of delivery for sanitizers and disinfectants. There is also the need to deliver very accurate amounts of chemistry for instrument care and hard surface cleaning. The technology would be available for both liquid and solid products. The present invention is also applicable for Housekeeping. The invention is able to be utilized as a platform for accurate solid, liquid or concentrate proportioning when it is used in conjunction with a device that can quantify an amount of water passing through a pipe. For example, if a known volume of water is used, and the load cell could detect the amount of concentrate dispensed, a proportion would be known. So in an accurate dispenser of this kind, the user would set a proportion. While water is filling up the use vessel, the concentrate is dispensed. Dispensing the concentrate occurs until the proportion is satisfied. If a known amount of water is passed through a pipe in a fixed time, the dispenser could dispense the concentrate to satisfy the proportion. For example, if 100 milliliters of water is passed through the dispenser, a known amount of concentrate would be needed to satisfy the set proportion. The known amount of concentrate could be dispensed and stopped, when the load cell is satisfied.

The present invention is also applicable for laundry systems. Present laundry systems service two machines at a relatively high cost. The system is both complex and costly. The load cell technology of the present invention would reduce both the cost and complexity of a current laundry dispenser. Further, the current laundry system for liquid also has significant drawbacks in that there is no empty drum alarm and no way to compensate for the reduced output of the peristaltic pump dispensing. Load cell technology of the present invention would allow for accurate dispensing of the peristaltic pump over time, providing a signal of when to change the squeeze tube, and allow and empty warning device. These would be significant improvements over the prior art. The foregoing is not an exhaustive list but are just further examples of the applicability of the present invention.

Various modifications and alterations of this invention will be apparent to those skilled in the art without departing from the scope and spirit of this invention. It should be understood that this invention is not limited to the illustrative embodiments set forth above.

The invention claimed is:

1. A method of dispensing a requested weight of an ingredient from a container, comprising:
    measuring an initial weight of the ingredient in the container;
    dispensing at least some of the ingredient from the container during a dispense cycle by eroding the ingredient with a diluent for a predetermined period of time;
    waiting for a lag time to allow the diluent to drain from the container;
    measuring, after the lag time has elapsed, a final weight of the ingredient in the container;
    determining a dispensed weight of the ingredient dispensed from the container by comparing the final weight with the initial weight;
    comparing the dispensed weight with the requested weight; and
    adjusting the predetermined period of time for a subsequent dispense cycle based on the comparison.

2. The method of claim 1 further comprising:
    comparing the initial weight with a known weight representative of an empty container to determine whether the container is empty; and
    replacing the container if the container is determined to be empty.

3. The method of claim 1 further comprising adjusting the predetermined period of time downward if the dispensed amount exceeds the requested amount.

4. The method of claim 1 further comprising adjusting the predetermined period of time upward if the requested amount exceeds the dispensed amount.

5. The method of claim 1 further comprising dispensing at least some of the ingredient from the container during the subsequent dispense cycle by eroding the ingredient with the diluent for the adjusted predetermined period of time.

6. The method of claim 1 wherein the ingredient is a solid product concentrate.

7. The method of claim 1 wherein the ingredient is powdered.

8. The method of claim 1 wherein dispensing at least some of the ingredient from the container includes spraying the ingredient with the diluent for the predetermined period of time.

* * * * *